Figure 1:
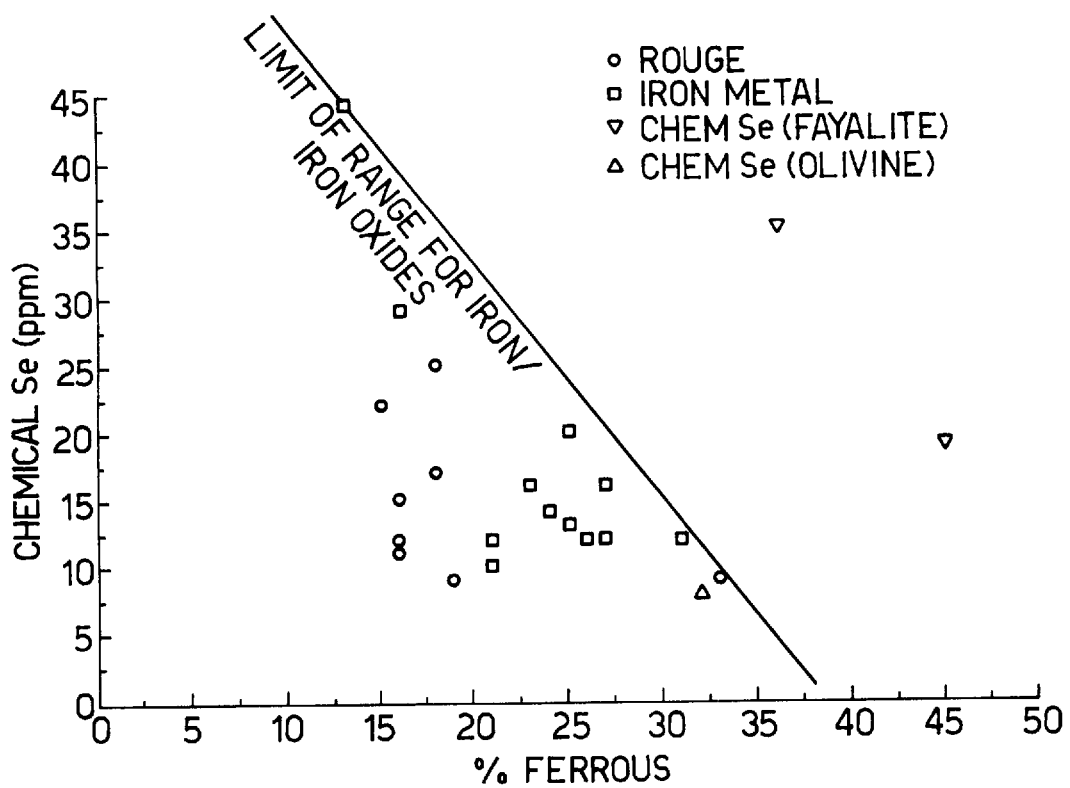

United States Patent [19]
Dickinson et al.

[11] Patent Number: 5,888,264
[45] Date of Patent: Mar. 30, 1999

[54] PREPARING GLASS COMPOSITIONS USING A FAYALITE IRON SOURCE

[75] Inventors: Clive Francis Dickinson; Glen Stuart Martin, both of Lancashire, United Kingdom

[73] Assignee: Pilkington plc, United Kingdom

[21] Appl. No.: 950,140

[22] Filed: Oct. 14, 1997

Related U.S. Application Data

[63] Continuation of Ser. No. 721,529, Sep. 26, 1996, abandoned.

[30]    Foreign Application Priority Data

Sep. 28, 1995  [GB]   United Kingdom ................. 9519772

[51] Int. Cl.$^6$ ................. C03B 5/16; C03B 5/18; C03B 5/20; C03B 5/225
[52] U.S. Cl. ................. 65/134.1; 65/135.1; 501/36; 501/68; 501/70; 501/71
[58] Field of Search .............. 501/36, 68, 70, 501/71; 65/134.1, 135.1

[56]    References Cited

U.S. PATENT DOCUMENTS

| | | | |
|---|---|---|---|
| 3,849,330 | 11/1974 | Isaacson et al. | 252/301.1 W |
| 3,857,700 | 12/1974 | Ammann et al. | 75/74 |
| 3,896,210 | 7/1975 | Ammann | 423/56 |
| 4,153,439 | 5/1979 | Tomić et al. | 65/2 |
| 4,234,380 | 11/1980 | Kihlstedt et al. | 162/152 |
| 4,764,487 | 8/1988 | Lewis | 501/70 |
| 4,818,289 | 4/1989 | Mantymaki | 106/117 |
| 5,023,210 | 6/1991 | Krumwiede et al. | 501/71 |
| 5,380,685 | 1/1995 | Morimoto et al. | 501/71 |
| 5,691,255 | 11/1997 | Jensen et al. | 501/36 |

FOREIGN PATENT DOCUMENTS

| | | |
|---|---|---|
| 96 30 6998 | 12/1996 | European Pat. Off. . |
| WO 96/28395 | 9/1996 | WIPO . |

OTHER PUBLICATIONS

Chemical Abstract, vol. 93, No. 12, Sep. 1980; Abstract No. 93: 118961n, G. KOCSIS et al., "Application of Basalt in Production of Glasses," p. 259.

*Primary Examiner*—Peter Chin
*Assistant Examiner*—Jacqueline A Ruller
*Attorney, Agent, or Firm*—Burns, Doane, Swecker & Mathis LLP

[57]              ABSTRACT

A method of preparing a ferrous iron-containing glass composition is provided. The method comprises melting a batch of glass-forming components including an iron source and refining the resultant melt. The iron source comprises a fayalite-containing material. Glass can be produced having an increased ferrous content and an associated higher level of solar heat absorption with improved visible light transmission as a result of lower iron (III) content.

26 Claims, 1 Drawing Sheet

PREPARING GLASS COMPOSITIONS USING A FAYALITE IRON SOURCE

This application is a continuation of application Ser. No. 08/721,529, filed Sep. 26, 1996 now abandoned.

The present invention relates to a method of preparing a ferrous iron-containing glass composition, to the use of iron compounds in preparing such compositions, and to glass compositions formed thereby.

In a conventional method of glass production, a furnace is used to melt and refine the glass composition prior to subsequent processing steps. Typically, a batch of glass-forming components is added to a melting zone so as to melt the batch. Downstream of the melting zone is a refining zone where the molten glass is refined so that gaseous bubble-forming impurities are released prior to cooling.

Most conventional glass includes a certain amount of iron which has either been incorporated deliberately in the batch or which is present naturally as part of a component in the batch. For example, sand used in glass production in the UK is generally thought to contain approximately 0.12% iron (III) and is typically present in batches at around 75% to 80% by weight. Dolomite is also a common batch component which may be added at a concentration of around 12% and is typically quoted as containing 0.24% iron (III) although a proportion of the iron may be present as iron (II).

Iron is also known as an additive to glass compositions in order to produce tinted glasses. In the finished glass, iron (II) absorbs in the infra-red region and may appear as a blue glass. On the other hand, iron (III) absorbs in the UV and visible regions and may appear yellow/green.

It is conventional to add the iron to the batch of glass-forming components in the form of rouge, which is a convenient source of iron (III). Where a high proportion of iron (II) is required in the finished glass, for example in solar control glasses, the iron (III) needs to be reduced during the glass-forming process.

A common method used to reduce the iron (III) is to add carbon to the batch of glass-forming components. A major drawback with the addition of carbon is that, as more carbon is added, the melting becomes poorer and may result in silica scum. Because of the poor melting, a practical limit is placed on the amount of carbon which may be added to any batch. Where higher iron (II) content is required, this is normally achieved both by carbon addition and by increasing the amount of rouge added to the batch. A drawback with this approach is that, although the ferrous iron content is sufficiently high in the finished glass, the iron (III) content is also very high, typically 70% of the total iron. This has the disadvantage that a significant loss in transmission of visible light is experienced in the finished glass.

Various attempts have hitherto been made to produce glass for buildings or motor vehicles which absorb in the infrared and ultraviolet regions. For example, EP-A-0488110 discloses a high ferrous iron-containing glass using ilmenite and rouge as the principal sources of iron. Reducing agents such as carbon are used to adjust the balance between ferrous and ferric iron in the finished glass.

EP-A-0527487 discloses the production of glass with a bluish tint which is capable of being toughened by conventional tempering. In order to achieve a relatively high ferrous content in the finished glass a separate frit glass is firstly made under reducing conditions so as to contain ferrous iron. The frit glass is subsequently used as part of a batch to produce a finished glass of relatively high ferrous content. Because two separate glass-making operations are required, this proposal is relatively expensive.

EP-A-0297404 discloses a method of making an infrared absorbing glass of high ferrous content by maintaining reducing conditions in the melting and/or refining stages. The method requires in practice a specialised furnace arrangement in which the melting and refining processes are separated into discrete stages.

U.S. Pat. No. 5,023,210 discloses a grey glass composition having reduced ultraviolet and infrared transmittances, which is essentially nickel-free. In one embodiment, high ferrous iron-containing materials are used as the iron source in order to produce a finished glass of high ferrous content.

The present invention provides a method of preparing a ferrous iron-containing glass composition. The method comprises melting a batch of glass-forming components including an iron source and refining the resultant melt. The iron source comprises a fayalite-containing material.

The present invention further provides the use of a fayalite-containing material as an additive for a batch of glass-forming components.

Glass may therefore be produced having an increased ferrous content and an associated higher level of solar heat absorption with improved visible light transmission as a result of lower iron (III) content.

Fayalite is ferrous silicate and either occurs naturally as a mineral or can be prepared synthetically. Fayalite is also present in olivine, basalt and garnet. Apart from these fayalite-containing materials, other useful sources of fayalite include slags produced from molybdenum ore smelting processes. Such slags generally have an iron silicate content in the range 15 to 30 wt %, almost all of which is fayalite. Fayalite is a surprisingly good source of ferrous iron because it is more stable to oxidation during glass-making than corresponding ferrous iron oxides such as FeO, and $Fe_3O_4$.

The amount of iron in the finished glass composition will depend to a large extent upon the use to which the finished product is to be put. Amounts up to 5 weight % are envisaged although a useful working range is from 0.05 to 2% by weight. Preferably, at least 0.05 weight % fayalite is present in the batch of glass-forming components. Where tinted products are required, for example as solar control glasses, the amount of iron in the finished product will preferably fall within the range 0.5 to 2 by weight %. Advantageously, the amount of ferrous iron expressed as a percentage of the total iron content of the finished glass is at least 20%, preferably in the range 30 to 45% by weight.

In a preferred embodiment of the invention, the amount of carbon deliberately added to the batch is in the range 0 to 0.05 wt %. Preferably, the batch of glass-forming components contains substantially no deliberately added carbon. Limitation of the amount of carbon present in a batch has the advantage of improving the melting characteristics of the glass composition.

In one embodiment of the present invention, the fayalite-containing material is added to the batch of glass-forming components, together with any other additives required to give rise to the optical properties desired in the finished glass. Ferrous titanate is a useful additive to batches of glass-forming components containing fayalite and is found in the mineral form of ilmenite. A useful property of ferrous titanate is that this material produces a glass containing $TiO_2$, which absorbs in the UV.

Other metal additives are also useful in controlling the colour and absorption properties of the finished glass. For example, selenium absorbs in the green/blue end of the visible spectrum and produces glass with a pink/red tint. Similarly, cobalt absorbs in the red end of the visible spectrum and makes the glass appear blue. Nickel can also be added to combinations of these additives to produce more neutral glasses, such as grey glass. By altering the composition of the glass, suitable tints can be produced in conjunction with the iron (II) and iron (III).

The present invention presents a further advantage in relation to the use of selenium in the glass compositions. Selenium metal is highly volatile and around 80 to 90% of the selenium added to conventional batches of glass-forming components is lost as vapour. This is undesirable because selenium is toxic. In conventional glass making processes an oxidising agent such as sodium nitrate is added together with selenium metal to help minimise selenium volatilisation. However, the presence of carbon in these processes limits the effectiveness of the oxidising agent and results in increased selenium volatilisation.

In accordance with the present invention, the absence or limitation of the amount of carbon provides the further advantage that the use of nitrates to help minimise selenium volatilisation is reduced or substantially eliminated. This, in turn, helps to minimise the amounts of nitrogen oxide gases released to the environment.

The present invention is especially useful for tinted flat glass applications such as architectural glass, and ophthalmic glasses. A particularly useful application is in the field of automotive glasses where the iron content needs to be varied, for example to confer suitable infra-red and/or ultraviolet absorption properties on the glass.

The present invention will now be described in further detail by way of example only with reference to the attached drawings, in which: FIG. 1 shows a graph of the variation of selenium retention with ferrous iron content in dark grey glass.

EXAMPLE 1

A batch of dark grey glass was formulated in accordance with Table I below and the composition of the batch was altered by varying the amount of ferrous iron added as rouge, iron metal, fayalite and olivine, as shown in FIG. 1. Each batch was melted in a furnace with a temperature of 1480° C. The maximum melting time was 90 minutes.

The prepared glasses were analysed chemically for ferric oxide, % ferrous, and selenium. Optical measurements were also made in respect of ferrous, selenium and cobalt by preparing a polished 4 mm section of glass for analysis on a spectrophotometer. The optical results were intended to serve as a guide only because the reamy nature of the glass was not ideal for such measurements. The results presented represent an average of several readings taken from each prepared section of glass.

| BATCH COMPOSITION for 1 Kg glass | | THEORETICAL GLASS COMPOSITION weight percent | |
|---|---|---|---|
| Sand | 724.64 | SiO2 | 72.26 |
| Dolomite | 181.96 | Al2O3 | 0.13 |
| Limestone | 50.75 | Fe2O3 | 1.00 |
| Soda ash | 230.38 | CaO | 8.62 |
| Gypsum | 5.67 | MgO | 3.87 |
| Sodium nitrate | 3.62 | Na2O | 13.82 |
| Rouge | 10.85 | K2O | 0.06 |
| Cobalt oxide | 0.15 | SO3 | 0.22 |
| Selenium metal | 0.098 | Co3O4 | 0.015 |
| | | Se | 0.0030 |

FIG. 1 shows the results of ferrous and selenium retained in the glass. The line represents the maximum level of both ferrous and selenium that could be generated using various iron oxides or iron metal. This line represents the limit for ferrous and selenium contents achievable using conventional materials. The limit was exceeded using fayalite, when significantly higher ferrous quantities were produced for acceptable selenium levels. Relative to the ferrous concentration, the selenium retention was improved even though nitrate was excluded from the batch. Olivine, which is a fayalite-containing material, also shows this improvement, although not to the same extent as the fayalite.

EXAMPLE 2

In this Example, molybdenum slag is used as a fayalite-containing material.

Batches of glass were formulated in accordance with Table II below using the method described in Example 1. Iron is added to the batch either as rouge (Batch A) or molybdenum slag (Batch B) and the total iron is determined in the finished glass. Whilst the percentage of total iron in the finished glass is approximately the same in both batches, the percentage total iron in ferrous state is far higher in the molybdenum slag-containing Batch B than in the conventional rouge-containing Batch A.

TABLE II

| Contents | Batch A | Batch B |
|---|---|---|
| Sand | 735.08 | 656.07 |
| Dolomite | 182.80 | 150.47 |
| Limestone | 45.83 | 57.42 |
| Soda Ash | 219.38 | 218.97 |
| Saltcake | 5.31 | 5.31 |
| Rouge | 16.96 | — |
| Molybdenum-slag | — | 120.04 |
| Finished Glass | | |
| Total Iron (expressed as Fe2O3) | 1.75% | 1.73% |
| % Total Iron in Ferrous State | 10% | 42% |

EXAMPLE 3

In this Example batches of glass containing rouge are compared with batches containing fayalite in respect of their selenium retention properties.

Batches of glass were formulated in accordance with Table III below using the method described in Example 1. In Batch A, iron is added as rouge in the conventional manner, whereas in Batch B iron is added as fayalite. The total iron content in both batches is 1% by weight of the finished glass. Once again, the amount of ferrous iron in the finished glass in the fayalite-containing Batch B is significantly higher than that in conventional Batch A. In addition, the amount of selenium retained in the finished glass is relatively high in both Batch A and Batch B.

In contrast, attempts to raise the ferrous content even to only 20% by weight using a conventional source of rouge causes the selenium present in the glass to drop below 10 ppm.

TABLE III

| Contents | Batch A | Batch B |
|---|---|---|
| Sand | 724.64 | 716.45 |
| Dolomite | 181.96 | 181.96 |
| Limestone | 50.75 | 50.75 |
| Soda Ash | 230.38 | 230.78 |
| Fayalite | — | 13.56 |

TABLE III-continued

| Contents | Batch A | Batch B |
|---|---|---|
| Rouge | 10.85 | — |
| Cobalt oxide | 0.15 | 0.15 |
| Selenium metal | 0.098 | 0.098 |
| Finished Glass | | |
| Ferrous % | 13% | 36% |
| Selenium | 44 ppm | 35 ppm |

We claim:

1. A method for preparing a ferrous iron-containing flat glass composition comprising:
   forming a batch of glass-forming components comprising a fayalite-containing iron source,
   melting the batch of glass-forming components, and
   refining the resultant melt to obtain a finished flat glass composition comprising 0.5 to 2 percent by weight total iron.

2. The method according to claim 1, wherein said fayalite-containing iron source is a slag produced from a molybdenum ore smelting process having an iron silicate content in the range of 15 to 30 wt %.

3. A method according to claim 1, wherein the fayalite-containing material further comprises olivine.

4. A method according to claim 1, wherein the fayalite-containing material further comprises basalt.

5. A method according to claim 1, wherein the fayalite-containing material further comprises garnet.

6. A method according to claim 1, wherein the fayalite-containing material further comprises $FeTiO_3$.

7. A method according to claim 6, wherein the $FeTiO_3$ is obtained from Ilmenite.

8. A method according to claim 1, wherein the amount of ferrous iron expressed as a percentage of the total iron content of the finished glass is at least 20% by weight.

9. A method according to claim 1, wherein the batch of glass-forming components contains substantially no carbon.

10. A method according to claim 9, wherein the batch of glass-forming components includes selenium.

11. A method according to claim 10, wherein the batch of glass-forming components includes no added nitrate.

12. A method according to claim 1, wherein the glass composition is a solar control glass composition.

13. A method for preparing a ferrous iron-containing flat glass composition comprising:
   forming a batch of glass-forming components comprising a fayalite-containing iron source and selenium,
   melting the batch of glass-forming components in the absence of added nitrates, and
   refining the resultant melt to obtain a finished flat glass composition.

14. The method according to claim 13, wherein said finished glass composition comprises at least 10 ppm selenium.

15. A method of preparing a ferrous iron-containing tinted flat glass composition, which method comprises melting a batch of glass-forming components including an iron source and refining the resultant melt, wherein the iron source comprises a fayalite-containing material.

16. A method according to claim 15, wherein the fayalite-containing material further comprises olivine.

17. A method according to claim 15, wherein the fayalite-containing material further comprises basalt.

18. A method according to claim 15, wherein the fayalite-containing material further comprises garnet.

19. A method according to claim 15, wherein the fayalite-containing material further comprises $FeTiO_3$.

20. A method according to claim 19, wherein the $FeTiO_3$ is obtained from Ilmenite.

21. A method according to claim 15, wherein the amount of ferrous oxide in the finished glass composition ranges from 0.05 to 5% by weight, based on the weight of the finished glass composition.

22. A method according to claim 15, wherein the amount of ferrous iron expressed as a percentage of the total iron content of the finished glass is at least 20% by weight.

23. A method according to claim 15, wherein the batch of glass-forming components contains substantially no carbon.

24. A method according to claim 23, wherein the batch of glass-forming components includes selenium.

25. A method according to claim 24, wherein the batch of glass-forming components includes no added nitrate.

26. A method according to claim 15, wherein the glass composition is a solar control glass composition.

* * * * *